United States Patent [19]

Hilsum

[11] Patent Number: 4,792,213
[45] Date of Patent: Dec. 20, 1988

[54] THERMAL IMAGING DEVICE

[75] Inventor: Cyril Hilsum, Pinner, England

[73] Assignee: The General Electric Company, p.l.c., United Kingdom

[21] Appl. No.: 892,953

[22] Filed: Aug. 4, 1986

[30] Foreign Application Priority Data

Aug. 12, 1985 [GB] United Kingdom ............... 8520172

[51] Int. Cl.$^4$ ............................................. G02F 1/13
[52] U.S. Cl. ................... 350/351; 252/299.01; 252/299.63; 252/299.66; 252/299.67; 252/299.7
[58] Field of Search .................... 350/351; 252/299.7, 252/299.01, 299.66, 299.63, 299.67

[56] References Cited

U.S. PATENT DOCUMENTS

| Re. 31,715 | 10/1984 | Coates et al. | 252/299.65 |
|---|---|---|---|
| 3,819,531 | 6/1974 | Saeva et al. | 252/299.01 |
| 4,040,047 | 8/1977 | Hareng et al. | 252/299.66 |
| 4,077,260 | 3/1978 | Gray et al. | 252/299.66 |
| 4,139,273 | 2/1979 | Crossland et al. | 252/299.66 |
| 4,149,413 | 4/1979 | Gray et al. | 252/299.66 |
| 4,219,255 | 8/1980 | Raynes | 252/299.01 |
| 4,257,911 | 3/1981 | Gray et al. | 252/299.65 |
| 4,264,148 | 4/1981 | Gobl-Wunsch et al. | 350/346 |
| 4,462,924 | 7/1984 | Raynes | 252/299.66 |
| 4,522,470 | 6/1985 | Iijima | 252/299.61 |
| 4,547,309 | 10/1985 | Mochizuki et al. | 252/299.7 |
| 4,615,586 | 10/1986 | Geary et al. | 252/299.01 |
| 4,645,305 | 2/1987 | Yokokura et al. | 252/299.63 |
| 4,650,600 | 3/1987 | Heppke et al. | 252/299.63 |

FOREIGN PATENT DOCUMENTS

| 136725 | 4/1985 | European Pat. Off. | 252/299.67 |
|---|---|---|---|
| 194659 | 9/1986 | European Pat. Off. | 252/299.67 |
| 57-212418 | 12/1982 | Japan | 252/299.01 |
| 58-29877 | 2/1983 | Japan | 252/299.66 |
| 59-122574 | 7/1984 | Japan | 252/299.66 |
| 60-47093 | 3/1985 | Japan | 252/299.63 |
| 60-144383 | 7/1985 | Japan | 252/299.67 |
| 61-13225 | 1/1986 | Japan | 252/299.66 |

OTHER PUBLICATIONS

Gray, G. W., et al, Mol. Cryst. Liq. Cryst., vol. 34 (Letters), pp. 211–217 (1977).
Gray, G. W., et al., Mol. Cryst. Liq. Cryst., vol. 37, pp. 189–211 (1976).
Goodby, J. W., et al., J. Am. Chem. Soc., vol. 108, pp. 4729–4735 (1986).

Primary Examiner—Teddy S. Gron
Attorney, Agent, or Firm—Kirschstein, Kirschstein, Ottinger, & Israel

[57] ABSTRACT

A thermal imaging device uses a compensated cholesteric liquid crystal mixture as its thermo-optic conversion element. The mixture is obtained by mixing two cholesteric liquid crystals, one with a left-handed twist and the other with a right-handed twist. The twists cancel at a compensation temperature, the mixture thus having infinite twist at this temperature. The device is designed to operate with the mixture held in the region of the compensation temperature.

10 Claims, 1 Drawing Sheet

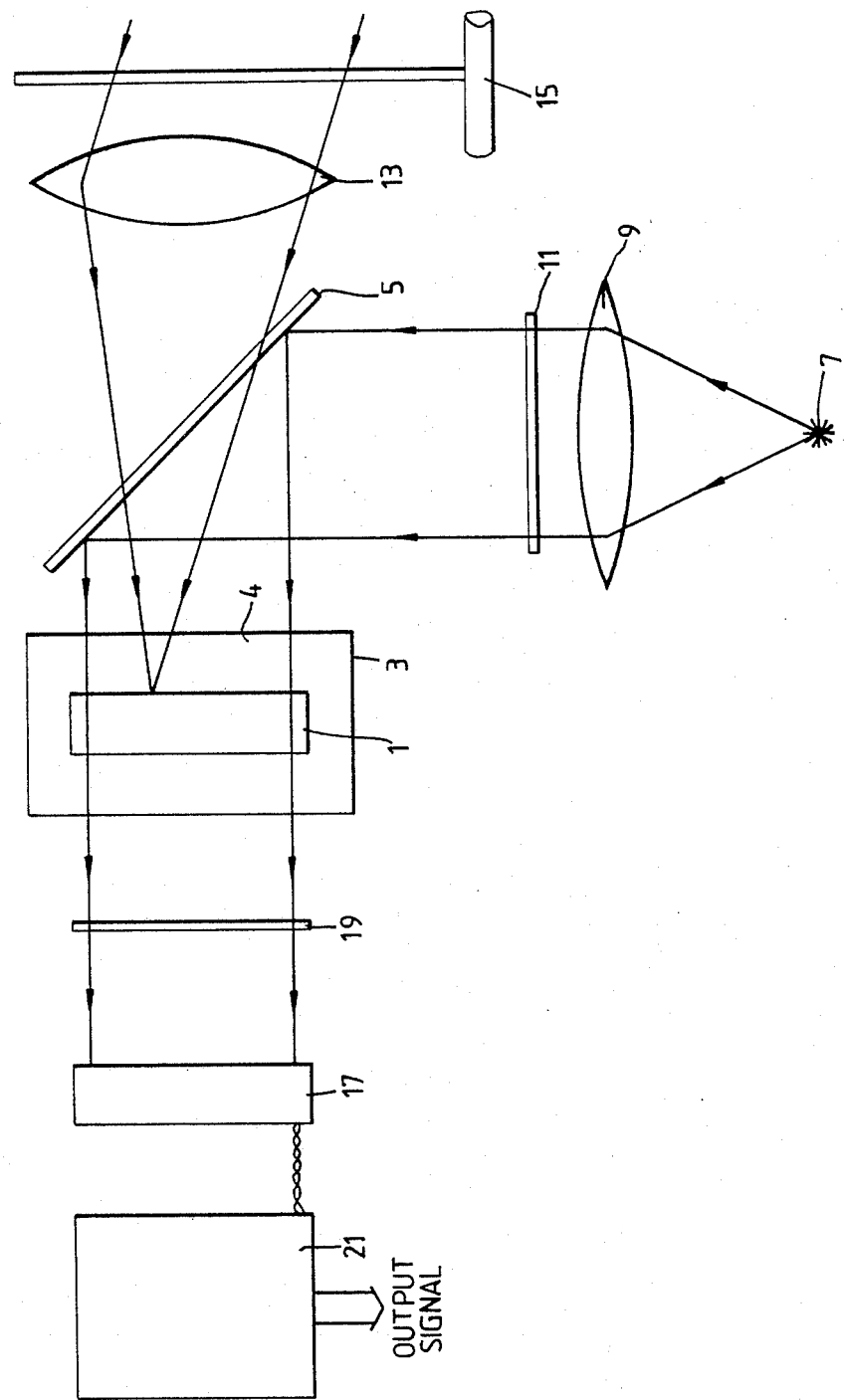

THERMAL IMAGING DEVICE

BACKGROUND OF THE INVENTION

1. Field of the Invention

This invention relates to thermal imaging devices. In particular the invention relates to thermal imaging devices incorporating as their thermo-optic conversion elements liquid crystals whose optical properties vary in dependence on the intensity of thermal radiation incident on the crystal so as to provide optical indications of the intensity of the incident thermal radiation.

2. Description of Related Art

Such an imaging device is described for example in Sov. J. Opt. Technol. 48 (2), 1981, pages 65-68. The device described in this publication incorporates a cholesteric liquid crystal which shows enhanced temperatures near a cholesteric-smectic phase transition. Several workers have subsequently made thermal imaging devices incorporating such crystals.

SUMMARY OF THE INVENTION

It is an object of the present invention to provide a thermal imaging device in which the temperature dependence of the optical properties of a liquid crystal incorporated in the device is enhanced over that normally available.

According to the present invention a thermal imaging device includes as its thermo-optic conversion element a compensated liquid crystal mixture obtained by mixing two cholesteric liquid crystals, one with left-handed twist, and the other with right-handed twist, the mixture having a composition such that the twists cancel at a compensation temperature the mixture thus having infinite pitch at the compensation temperature, the imaging device being designed to operate with the mixture held in the region of the compensation temperature.

Preferably one of the cholesteric crystals is near a smectic phase change at the compensation temperature.

BRIEF DESCRIPTION OF THE DRAWING

Two thermal imaging devices in accordance with the invention will now be described by way of example only, with reference to the sole figure which is a schematic diagram of the first device.

DETAILED DESCRIPTION OF THE PREFERRED EMBODIMENTS

Referring to the sole figure, the first device to be described comprises a liquid crystal mixture 1 enclosed within a temperature controlled enclosure 3, at least one wall 4 of which is designed to be transparent to infrared radiation emitted from a field of view to be imaged. Adjacent the wall 4 there is placed a dichroic mirror 5 which is designed to transmit infra-red radiation, and reflect light of other wavelengths. The mirror 5 is angled so as to direct light from a source 7 onto the wall 4 of the enclosure 3, a lens 9 being used to provide a parallel beam of light from the source 7, and a polariser 11 being provided to polarise this beam. An infra-red lens 13 is positioned so as to focus infrared radiation from the field of view onto the liquid crystal mixture, a chopper 15 also being provided to chop the incident radiation.

At the side of the enclosure 3 remote from the wall 4 there is provided a detector 17 such as a TV camera, an analyser 19 being interposed between the detector 17 and the enclosure 3. The electrical output of the detector 17 is linked to a signal processor 21. The liquid crystal mixture 1 is formed from two cholesteric liquid crystals, cholesteryl chloride which has a right-handed helical structure or twist, and cholesteryl myristate which has a left-handed helical structure or twist, the mixture including the two crystals in the proportions 1.6 to 1.0 by weight. The liquid crystal mixture also has a helical structure whose pitch is sensitive to the temperature, at a particular compensation temperature $T_N=42.5°$ C. the pitch being infinite as the mixture changes from a right-handed structure to a left-handed structure at this temperature. Within 1° C. of the temperature $T_N$ a very high sensitivity of the rotatory power of the mixture with temperature is obtained, as shown in FIG. 4.1.3. of "Liquid Crystals" by S. Chandrasekhar, published by the Cambridge University Press, 1977.

In use of the device the temperature controlled enclosure 3 is operated so as to maintain the mixture at a temperature either just below or just above the temperature $T_N$. Infra-red radiation focussed onto the mixture 1 will cause the direction of polarisation of the light from the source 7 to be rotated by the mixture 1 by an amount dependent on the intensity of the incident infrared radiation. Thus, due to the presence of the analyser 19 interposed between the detector 17 and the enclosure 3, the pattern of light from the source 7 received by the detector will also be dependent on the intensity of the infrared radiation incident on the mixture 1. An image corresponding to the pattern of the infra-red radiation in the mixture 1 may thus be formed, the signal processor 21 being arranged to enhance the contrast of the pattern of light incident on the detector 17 by electronic means, to produce an output signal to be used to form the image.

Due to the crystal mixture 1 being maintained in close proximity to the temperature $T_N$, a high device sensitivity to temperature is achieved, giving the device the ability to detect small temperature changes in the field of view within a range of about 1° C. As however a range of 1° C. is relatively large for such a device, the temperature stabilisation required of the device is not too critical compared to that frequently required in thermal imaging devices. By maintaining the mixture 1 at a temperature just off the compensation temperature, ambiguity is avoided.

Alternatively if the mixture 1 is maintained at its compensation temperature when the chopper 15 is blocking the incident radiation from the field of view the dark field signal of the detector 17 will be independent of the thickness of the liquid crystal mixture 1 thus facilitating the signal processing carried out by the processor 21.

The birefringence of the crystal mixture 1 at the compensation temperature $T_N$ is also very sensitive to temperature, and this may also be employed in the imaging device to obtain an optical indication of the temperature of incident infra-red radiation on the imaging device.

A number of other compensated liquid crystal mixtures suitable for use in a thermal imaging device in accordance with the invention are also available, and the second thermal imaging device to be described includes such an alternative mixture. The second device, is therefore of the same general form as the first device, but includes a mixture of the two cholesteric (chiralnematic) biphenyls, whose formulas are given below, the two liquid crystals having reverse twists to each other.

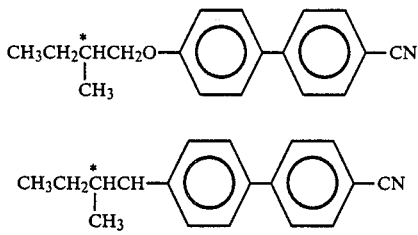

It will be appreciated that the temperature sensitivity of a device in accordance with the invention will be enhanced still further if one of the cholesteric components is near a smectic phase change at the compensation temperature. This will give an enhanced rate of change of pitch with temperature, thus increasing the rate of change of rotatory power with temperature.

What is claimed is:
1. A thermal imaging device, comprising:
   (a) a thermo-optic conversion element including a compensated cholesteric liquid crystal mixture of two cholesteric liquid crystals, one with a left-handed twist, and the other with a right-handed twist, said mixture having a composition such that said twists cancel at a compensation temperature, whereby said mixture has infinite pitch at said compensation temperature;
   (b) means for maintaining said compensated liquid crystal mixture substantially at said compensation temperature;
   (c) means for directing onto said compensated liquid crystal mixture thermal radiation from a field of view to be imaged, so that said thermal radiation causes changes in alignment of said compensated liquid crystal mixture; and
   (d) means responsive to aid alignment for producing an image of said field of view.
2. A device according to claim 1 in which one of said two cholesteric liquid crystals is cholesteryl myristate, and the other of said two cholesteric liquid crystals is cholesteryl chloride.
3. A device according to claim 1, in which said mixture is a mixture of two bipenyl chiral dopants in a nematic host, the two dopants inducing reverse twists to each other in the host.
4. A device according to claim 3, in which the two dopants are

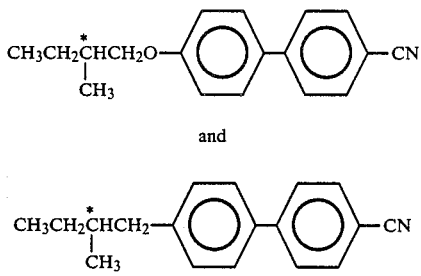

5. A device according to claim 1, in which one of said two cholesteric liquid crystals exhibits smectic phase change adjacent said compensation temperature.
6. A device according to claim 1, in which said means for maintaining the temperature of said compensated liquid crystal mixture is operative to maintain said temperature slightly offset from said compensation temperature so as to avoid ambiguity in a output signal of the device.
7. A device according to claim 1, and further comprising means operative for blocking said thermal radiation temporarily from reaching said compensated liquid crystal mixture for use in setting up said image producing means while said compensated liquid crystal mixture is temporarily maintained at said compensation temperature.
8. A device according to claim 1, wherein said means for directing said thermal radiation comprises a dichroic mirror which transmits said thermal radiation and reflects radiation of other wavelengths.
9. A device according to claim 1, wherein said means responsive to said alignment comprises a source of visible light, means for directing said visible light onto said compensated liquid crystal mixture, and means responsive to polarization of said visible light caused by said alignment for producing said image.
10. A device according to claim 9, wherein said means responsive to polarization of said visible light includes a television camera.

* * * * *